(12) United States Patent
Lin

(10) Patent No.: US 6,167,631 B1
(45) Date of Patent: Jan. 2, 2001

(54) PLUMMET LEVEL

(76) Inventor: Wen Chin Lin, No. 5, Alley 1, Lane 211, Jen Ho St., Pa Te City, Tao Yuan Hsien (TW)

( * ) Notice: Under 35 U.S.C. 154(b), the term of this patent shall be extended for 0 days.

(21) Appl. No.: 09/321,855

(22) Filed: May 28, 1999

(51) Int. Cl.[7] ................................................ G01C 9/16
(52) U.S. Cl. .............................................. 33/395; 33/374
(58) Field of Search ............................ 33/281, 283, 285, 33/365, 374, 391, 395, 451

(56) References Cited

U.S. PATENT DOCUMENTS

| 39,124 | * | 7/1863 | Davison et al. ....................... 33/391 |
| 839,662 | * | 12/1906 | Smith ..................................... 33/391 |
| 1,312,303 | * | 8/1919 | Berry ..................................... 33/391 |
| 4,586,263 | * | 5/1986 | Brattain ................................. 33/391 |
| 4,607,437 | * | 8/1986 | McSorley, Sr. et al. ............. 33/374 |
| 4,667,413 | * | 5/1987 | Pitts ....................................... 33/391 |
| 4,771,546 | * | 9/1988 | Cavozos ................................. 33/391 |

FOREIGN PATENT DOCUMENTS

| 120184 | * | 5/1901 | (DE) ..................................... 33/391 |

* cited by examiner

Primary Examiner—G. Bradley Bennett
(74) Attorney, Agent, or Firm—Dougherty & Troxell

(57) ABSTRACT

A plummet level for checking the horizontal state of a surface and locating two vertically spaced points generally required by wood working in most interior decorative works. The plummet level includes a rectangular main body divided into front and rear compartments for balance beam and weight-loaded swing link, respectively, to mount therein on a central pivot shaft. Two long clear windows are separately provided on walls of the main body facing the balance beam and the swing link. A plurality of spaced and parallel check lines horizontally extend a full length of the windows. A user may visually overlap one of the check lines on the windows and a reference level/vertical line on the balance beam/swing link to check a working surface for its horizontal or vertical state. Two extensible links are connected to two ends of the main body with four right-angled corners defined by an end plate of each extensible link always in alignment with four side walls of the main body, so that the plummet level may be easily extended to conveniently locate and mark a horizontally or vertically corresponding point at a distance longer than the main body of the plummet level.

3 Claims, 6 Drawing Sheets

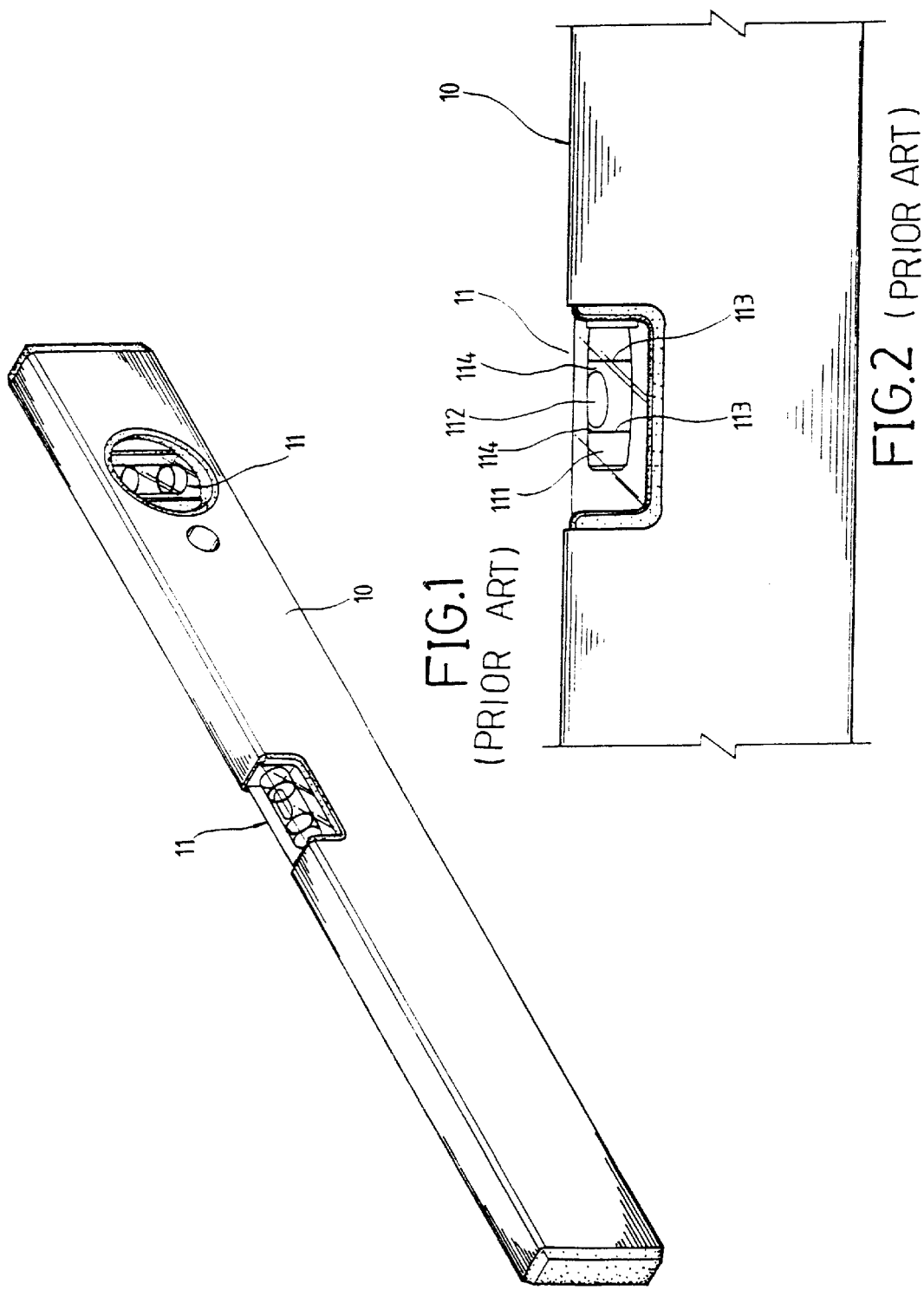

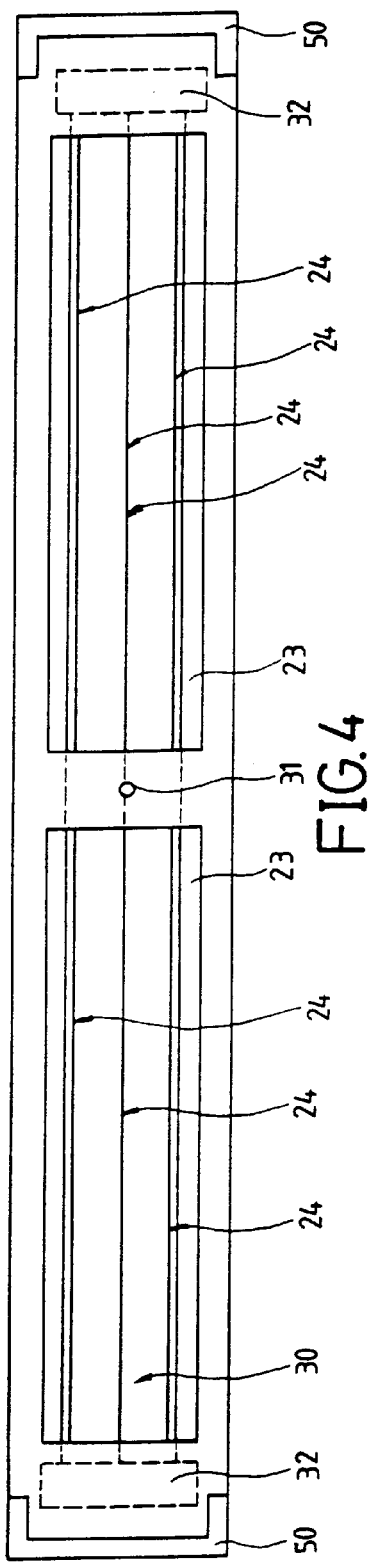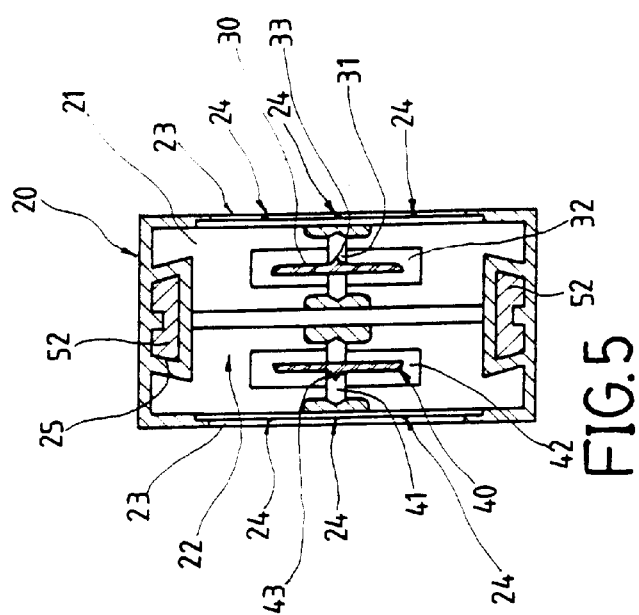

PLUMMET LEVEL

BACKGROUND OF THE INVENTION

The present invention relates to a plummet level, and more particularly to a plummet level having a balance beam and a weight-loaded swing link provided in a front and a rear compartment, respectively, of the level. The balance beam and the swing link both have a reference line marked on their front surface. By visually overlapping one of several spaced check lines provided at front and rear surfaces of the plummet level and one of the reference lines, a working surface may be easily tested for its horizontal or vertical state.

A plummet level has been widely used in construction works and interior decorative works to find an accurate horizontal and/or vertical surface, and is particularly useful in wood working. The conventional plummet level normally includes a liquid container mounted on a main body of the level and having a bubble contained therein. There are many improved levels developed in recent years and being equipped with auxiliary laser means. Taiwanese New Utility Model Patent Application No. 87204670 published under Pub. No. 342936 entitled "A Level"; No. 87202762 published under Pub. No. 344456 entitled "Structure for a Laser Level"; and No. 87207229 published under Pub. No. 344457 entitled "A Laser Level" all disclose levels with laser. The provision of laser means on the levels is only to enable locating of a certain distant point. To determine a horizontal or vertical surface, such laser levels still rely on conventional bubble levels.

The conventional bubble level mainly includes a see-through container in which a liquid and a small amount of gas are contained so that a bubble of suitable size is formed in the container. Two laterally spaced locating lines are very precisely marked on the wall of the clear container to define a center mark area on the container. When the bubble is centered in the center mark area, it indicates the surface under checking is a horizontal or vertical surface. Since the bubble has a width usually smaller than that of the center mark area, a user must visually determine whether the bubble is just centered in the center mark area. Due to the very small distances existing between two ends of the bubble and the two marking lines, as well as the observation of the bubble from different visual angles, it is very possible to make inaccurate and incorrect determination of the location of the bubble in the center mark area. Such inaccurate determination will inevitably affect precise connections in wood works, such as in the condition of mortise and tenon joints.

Moreover, when using the auxiliary laser means on the level to conveniently locate a remote point by projecting a laser beam simply based on a visually determined reference point, the possibility of producing a big error is high. On the other hand, the auxiliary laser means is not necessarily useful or practical for woodworks in an interior decorative project that usually involves only very small space and short distances. This is because a worker can easily and directly locate a horizontally or vertically distant point by means of a plummet level. In the event a laser beam is to be projected from a plummet level for measuring another distant target, the plummet level itself must be first adjusted and controlled to serve as a reference point by, for example, mounting the level on a tripod and adjusting the latter to a desired position. This is, of course, very troublesome for a wood work that does not include so many distant points to be measured or located.

However, it is indeed a common situation that only one single level is not long enough for locating and marking a somewhat distant point that is located by using the plummet level. For example, when a wooden mullion is to be vertically mounted between two horizontal wooden transoms, it is necessary to use a plummet level to locate two vertically corresponding points separately on the two horizontal transoms. It is very possible a vertical distance between the two transoms is larger than an overall length of the plummet level and an operator fails to easily and directly mark the point on the distant transom by aligning a distal end angle of the plummet level with the point. At this time, an auxiliary laser beam surely would be helpful to locate the vertically corresponding point on the distant transom. However, it would be easier and more convenient if the plummet level is provided with extensible end portions that can be pulled out to increase the overall length of the plummet level and serve as means to contact and align with the corresponding point located at the distant transom to permit accurate marking it on the transom.

FIGS. 1 and 2 illustrate a conventional plummet level 10 on which two bubble levels 11 are provided. One of the bubble levels 11 extends in a horizontal direction for checking the horizontal state of a working surface and the other in a vertical direction for checking the vertical state of a working surface. The bubble level 11 includes a clear container 111 for containing a liquid and a small amount of gas, so that a suitably sized bubble 112 is formed in the container 111. Two laterally spaced marking lines 113 are very precisely provided on the clear wall of the container 111 to define a center mark area between them. When the plummet level 10 is in a horizontal position on a working surface, and the bubble 112 in the liquid container 111 of the horizontal bubble level 11 is centered between the two marking lines 113, the working surface is determined as a horizontal surface. Similarly, when the plummet level 10 is in an upright position for checking a vertical working surface or locating two vertically spaced points, and the bubble 112 in the liquid container 111 of the vertical bubble level 11 that is now in a horizontal position is centered between the two marking lines 113, the working surface are determined as a vertical surface or the two spaced points are determined as on a vertical line.

It is very uneasy to determine whether the bubble 112 is just centered between the two marking lines 113. An operator can visually determine a centered bubble 112 only by distances 114 between two ends of the bubble 112 and the two marking lines 113. When the distances 114 at either end of the bubble 112 are visually determined as equal, the working surface is determined as horizontal or vertical.

It is known that the distances 114 are so small that they can not be easily and accurately determined as longer or shorter compared to one another. They are also other factors, such as different visual angles relative to the liquid container 111 that would affect correct determination of a centered bubble 112.

Although the plummet level 10 has simple structure based on a self-explaining principle and been widely used for a long time, it does not ensure an accurate and precise determination of a horizontal and vertical surface.

It is therefore tried by the inventor to develop a plummet level that does not employ liquid container and bubble to determine a horizontal or vertical surface, but employs nowadays precision machining technique to achieve easy but absolutely accurate determination of a horizontal or vertical surface.

SUMMARY OF THE INVENTION

It is a primary object of the present invention to provide a plummet level that includes a main body in which a balance beam and a weight-loaded swing link are separately mounted on a central pivot shaft to provide a reference level line and a reference vertical line, respectively. A plurality of spaced and parallel check lines extend a full length of long clear windows separately provided on two walls of the main body facing the balance beam and the swing link. By visually overlapping one of the check lines with the level or vertical reference line depending on actual need, a working surface under checking can be easily decided to be horizontal/vertical or not.

Another object of the present invention is to provide the above-mentioned plummet level that further includes two extensible links connected to two outer ends of the main body. The extensible link each includes an end plate having four right-angled corners aligned with side walls of the main body and two guide bars. The two guide bars are slidably received in dovetail slots provided at inner side of the main body, such that the extensible links may be pulled out relative to the main body to facilitate convenient marking of a horizontally or vertically corresponding point at a distance longer or higher than the main body of the plummet level.

BRIEF DESCRIPTION OF THE DRAWINGS

FIG. 1 is a perspective of a conventional level;

FIG. 2 is an enlarged fragmentary front elevation of the conventional level of FIG. 1;

FIG. 4 is a front elevation of the plummet level of FIG. 3;

FIG. 5 is a side sectional view of the plummet level of FIG. 3;

DETAILED DESCRIPTION OF THE PREFERRED EMBODIMENTS

Figure 3:
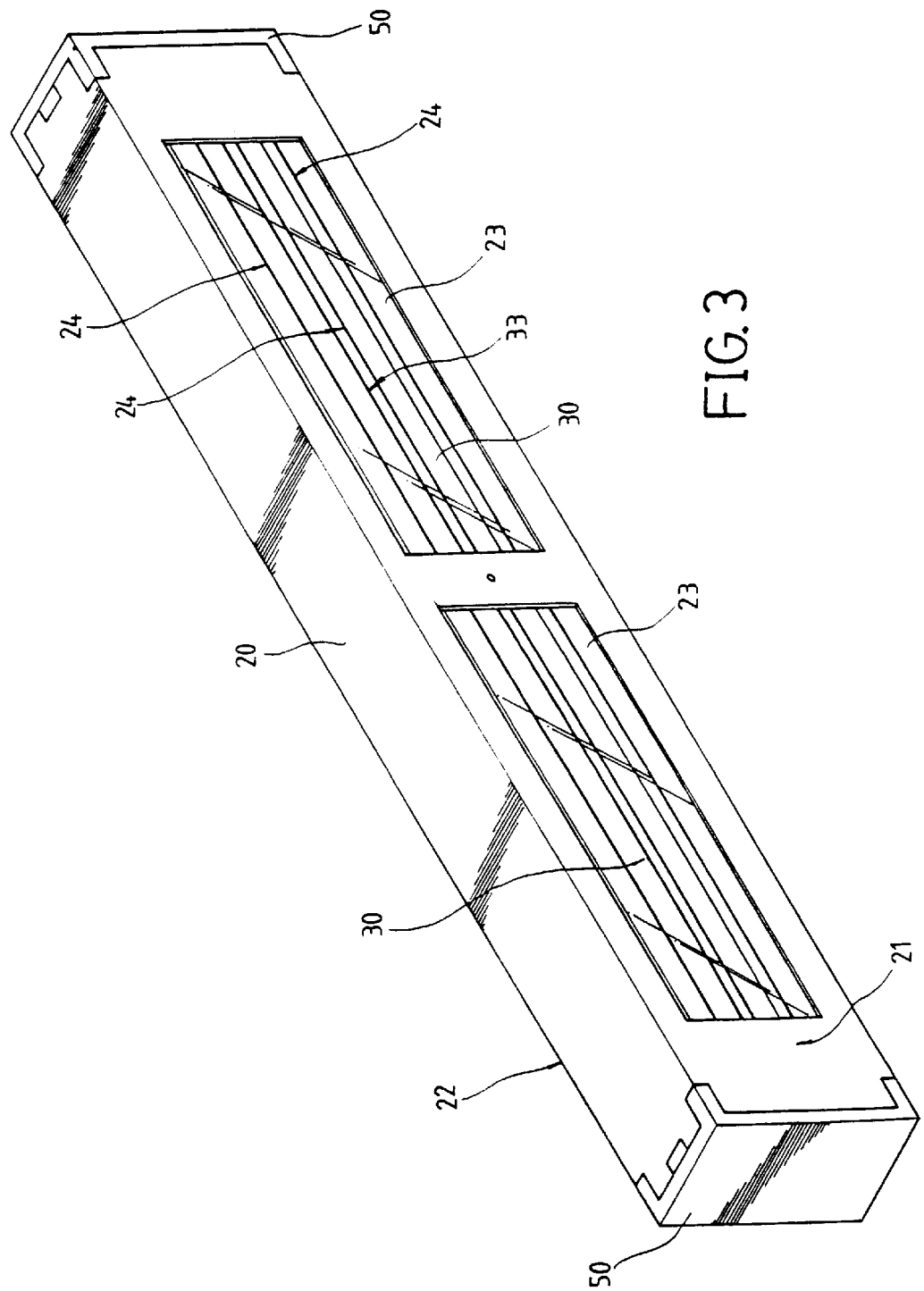
FIG. 3 is a perspective of a plummet level according to a preferred embodiment of the present invention.

Please refer to FIGS. 3, 4 and 5. A plummet level according to the present invention mainly includes a main body 20 that may be a long hexahedral case. The main body 20 defines an internal space that is divided into a front half 21 and a rear half 22. There is a beam 30 supported in the front half 21 of the main body 20 based on the principle of a balance to always maintain in a horizontal and balanced state. More particularly, the beam 30 is in a predetermined proper length with its middle point supported on a central pivot shaft 31. Weights 32 of equal weight are symmetrically provided at two ends of the beam 30. Through precision machining, the beam 30 on the central pivot shaft 31 is allowed to freely maintain in the horizontal and balanced state at a minimum friction. In other words, when the main body 20 is positioned on a non-horizontal surface, the beam 30 is always automatically in a horizontal and balanced state.

The beam 30 is also provided at its front surface with a reference level line 33 axially extended a full length of the beam 30 along a central line thereof. It is preferable the reference level line 33 is painted with a bright color.

Figure 6:
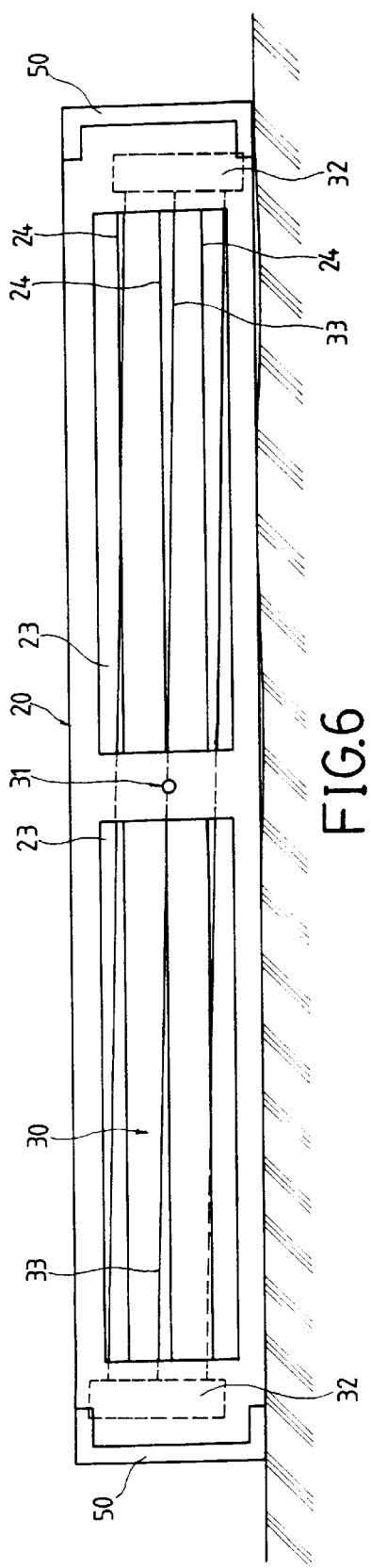
FIG. 6 is a front elevation of the plummet level of FIG. 3 being used to determine the horizontal state of a surface.
Figure 7:
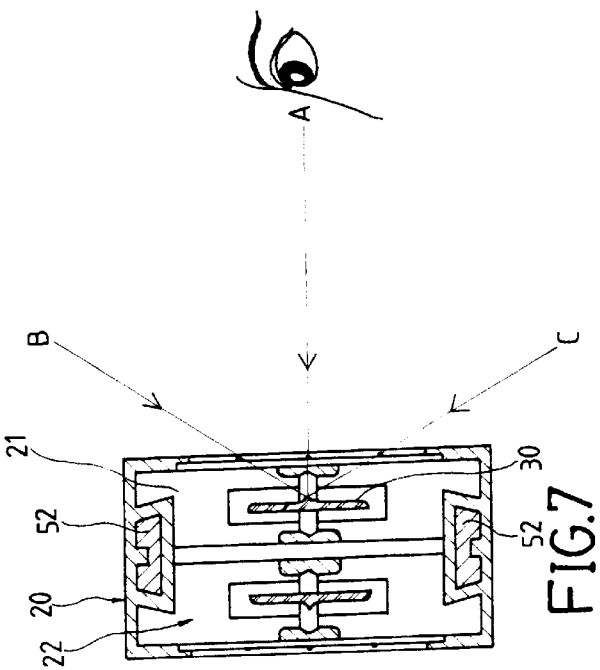
FIG. 7 is a side sectional view showing the use of the plummet level of FIG. 3 to determine a horizontal surface from different visual angles.

A first long clear window 23 is provided on a front surface of the main body 20 facing the front half 21. The first long clear window 23 has an overall length at least equal to that of the reference level line 33, so that a user may easily view the reference level line 33 via the first long clear window 23. A plurality of properly spaced parallel check lines 24 are provided on the first long clear window 23 to extend a full length of the first long clear window 23. A user viewing the level at different visual angle relative to the main body 20 may select a suitable check line 24 that would overlap reference level line 33 when viewing from the user's position, as shown in FIGS. 6 and 7. That is, when the main body 20 is positioned on a non-horizontal working surface, the beam 30 and the reference level line 33 thereon will still maintain in a horizontal state. However, the first long clear window 23 on the main body 20 and the check lines 24 on the first long window 23 are in an inclined position and there is an angle between the check lines 24 and the reference level line 33. From the inclined check lines 24 and the angle of inclination, the user may decide the manner of correcting or smoothing the non-horizontal working surface to obtain a horizontal surface. Since the user is not always at a visual angle fully aligning with the first long clear window 23, a check line 24 best suitable for overlapping the reference level line 33 may be selected from the user's visual angle A, B or C, as shown in FIG. 7.

Since the beam 30 has a predetermined length, there is a considerable distance existing between the central pivot shaft 31 and two outer ends of the beam 30. This long distance allows for a clear indication of degree of deviation of the check line 24 from the reference level line 33. In other words, the long distance between the central pivot shaft 31 and the outer ends of the beam 30 facilitates increased accuracy in judging the deviation of the check line 24 from the reference level line 33 and accordingly the inclination of the working surface.

Figure 8:
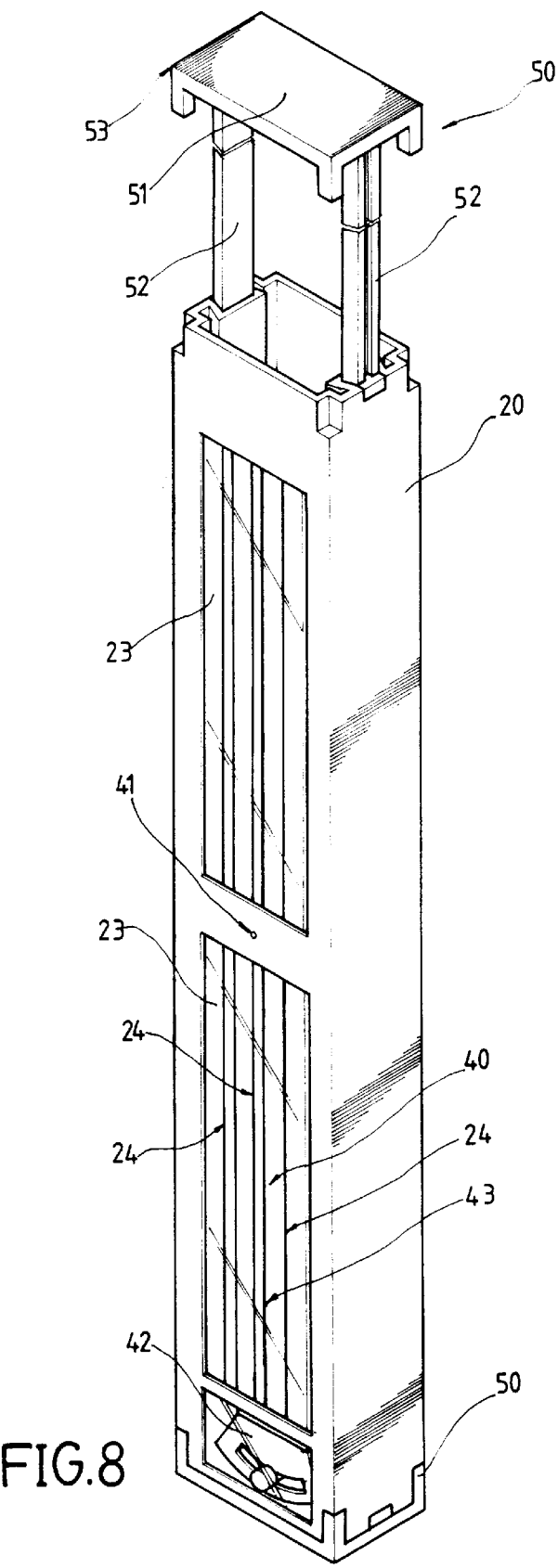
FIG. 8 is a perspective of the plummet level of the present invention in a vertical position for determination of a vertical surface.

As shown in FIGS. 5 and 8, a swing link 40 is provided in the rear half 22 of the main body 20 based on the plummet principle. The swing link 40 has a predetermined proper length and a middle point supported on a central pivot shaft 41. A weight 42 is connected to one end of the swing link 40. The weight 42 may be of any shape, so long as it can always keep the swing link 40 in a vertical position with the end having the weight 42 accurately and precisely pointing downward. With the same structural principle and checking manner as that adopted for the front half 21, the rear half 22 of the main body 20 has a reference vertical line 43 provided on the swing link 40 along a central line thereof, and a second long clear window 23 and parallel check lines 24 matching with the second long clear window 23 in length provided on a rear surface of the plummet level facing the swing link 40. With the rear half 22 of the main body 20, the plummet level of the present invention may be used to accurately judge whether a working surface is in a vertical state.

Figure 9:
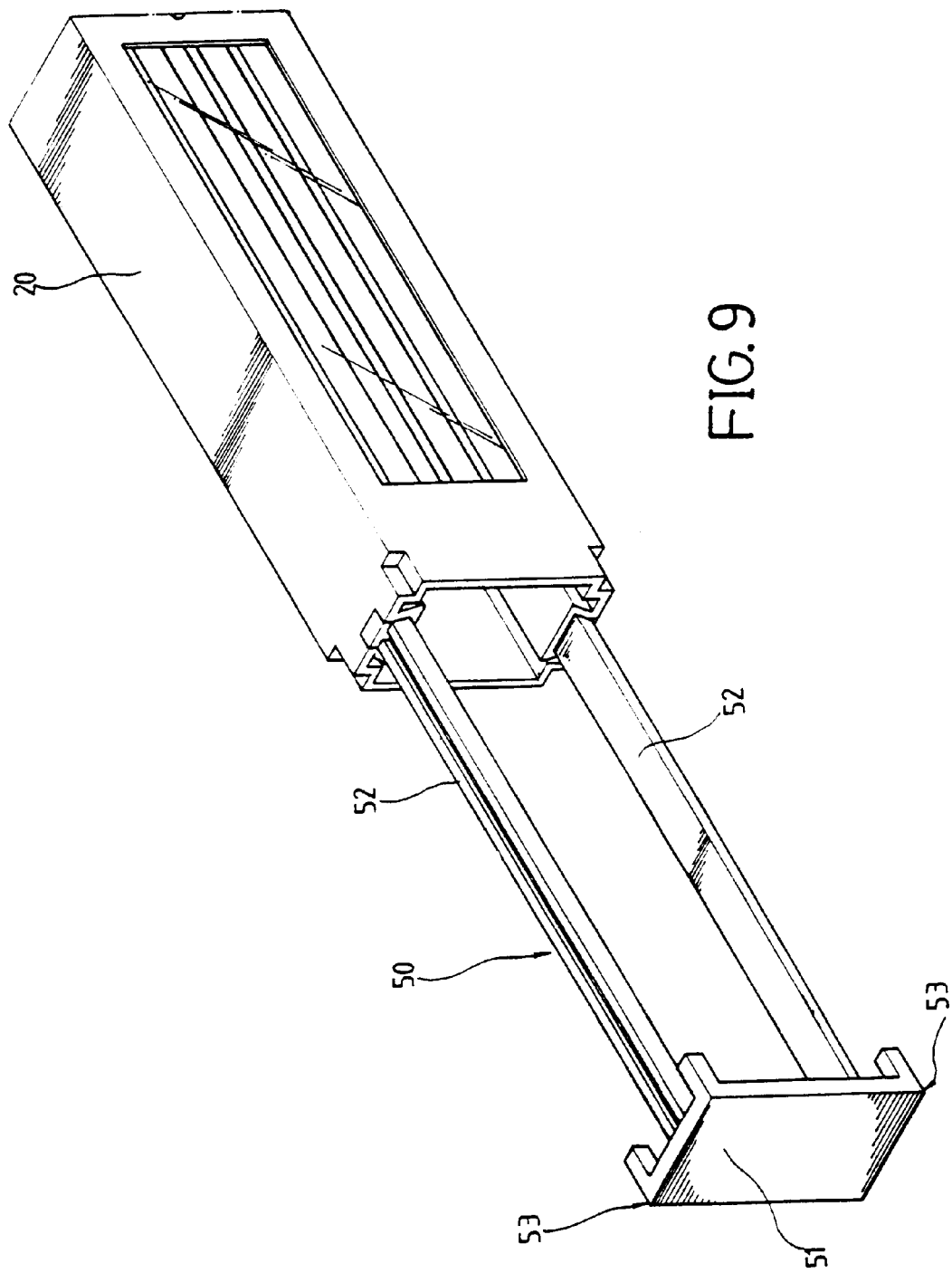
FIG. 9 is a fragmentary perspective of the plummet level of the present invention showing an extensible link thereof in an extended position.

Please refer to FIGS. 3, 8 and 9 at the same time. The main body 20 is provided at two outer ends each with an extensible link 50. The extensible link 50 each includes an end plate 51 and two guide bars 52. The end plate 51 has four inward perpendicularly extended corners 53 defining four right angles. When the extensible link 50 is at a home position closed to an end of the main body 20, the right-angled corners 53 are flush with four outer side walls of the main body 20. And, when the extensible link 50 is pulled out to an extended position, the right-angled corners 53 are still in alignment with four outer side walls of the main body 20 to enable easy and direct marking of a distant point located by the plummet level of the present invention by aligning one of the right-angled corners 53 of the extended end plate 51 with the located point. The guide bars 52 may be slidably received in dovetail slots 25 axially provided along the main body 20, so that the extensible links 50 can always be maintained at accurate positions to enable precise measurements. The dovetail slots 25 may be provided inside the main body 20 along central lines of upper and lower walls of the main body 20. However, the dovetail slots 25 may be otherwise provided inside the main body 20 along four corners thereof and the two guide bars 52 of each extensible link 50 may be so arranged that they are slidably received in two diagonally opposite dovetail slots 25 in the main body 20. In the latter case, the dovetail slots 25 are allowed to have a maximum length in the main body 20 and therefore permit increased length of extension of the extensible links 50 for convenient use in measuring an overhead working surface longer than the main body 20.

What is claimed is:

1. A plummet level comprising a long hexahedral main body having a predetermined proper length, and two extensible links connected to two ends of said main body;

said main body defining an internal space that is divided into front and rear halves; said front half having a first central pivot shaft provided therein for supporting a beam having a predetermined proper length, such that said beam always maintains in a horizontal and balanced state, a reference lever line being provided at a front surface of said beam along a full length of a central line of said beam, a first long clear window being provided on a wall of said main body facing said beam, said first long clear window having an overall length substantially equal to that of said beam and a plurality of spaced and parallel check lines extending a full length of said first long clear window; and said rear half having a second central pivot shaft provided therein for supporting a swing link having a predetermined proper length, said swing link having a plummet connected to one end thereof so that said swing link is always in a vertical position with said end having said plummet always pointing downward when said plummet level is in a vertical position, said swing link also having a reference vertical line provided at its front surface along a full length of its central line, a second long clear window being provided on a wall of said main body facing said swing link, said second long clear window having an overall length substantially equal to that of said swing link and a plurality of spaced and parallel check lines extending a full length of said second long clear window; and said extensible links each including an end plate and two guide bars, said end plate each has four inward and perpendicularly extended corners that each defines a right angle, said four right-angled corners of each said end plate being respectively in alignment with four side walls of said main body, said guide bars being slidably received in dovetail slots axially provided inside said main body, so that said extensible links may be pulled or pushed relative to said main body;

whereby a user may use said plummet level to check a working surface for its horizontal or vertical state by visually overlapping one of said check lines and said reference level line or said reference vertical line, and when a working surface that has a length or height exceeded said length of said main body, said extensible links may be selectively pulled out to facilitate convenient measuring of said working surface.

2. A plummet level as claimed in claim 1, wherein said dovetail slots are provided at inner sides of upper and lower walls of said main body along central lines of said upper and lower walls.

3. A plummet level as claimed in claim 1, wherein said dovetail slots are provided at inner sides of said main body along four corners thereof, such that said two guide bars of each said extensible link are slidably received in two of said dovetail slots diagonally opposite to one another.

* * * * *